(12) United States Patent
Guyomard

(10) Patent No.: US 6,474,727 B1
(45) Date of Patent: Nov. 5, 2002

(54) FIXING OF A FLUID RESERVOIR, ESPECIALLY FOR AN ITEM OF MOTOR-VEHICLE EQUIPMENT

(75) Inventor: Jean-Nicolas Guyomard, Le Mesnil Fuguet (FR)

(73) Assignee: Valeo Thermique Moteur, La Verriere (FR)

( * ) Notice: Subject to any disclaimer, the term of this patent is extended or adjusted under 35 U.S.C. 154(b) by 0 days.

(21) Appl. No.: 09/610,683

(22) Filed: Jul. 7, 2000

(30) Foreign Application Priority Data

Jul. 8, 1999 (FR) .............................. 99 08871

(51) Int. Cl.⁷ .............................................. B60R 27/00
(52) U.S. Cl. ..................... 296/194; 296/1.1; 296/208.02
(58) Field of Search ...................... 296/1.1, 194, 203.02

(56) References Cited

U.S. PATENT DOCUMENTS

| | | | | |
|---|---|---|---|---|
| 4,775,102 A | * | 10/1988 | Negishi ...................... 237/12.3 |
| 5,271,473 A | * | 12/1993 | Iketa et al. ............. 296/194 X |
| 5,409,288 A | * | 4/1995 | Masuda ...................... 296/194 |
| 5,499,690 A | * | 3/1996 | Shearn et al. ........... 296/194 X |
| 5,533,780 A | * | 7/1996 | Larson et al. ................ 296/194 |
| 5,573,299 A | * | 11/1996 | Masuda ...................... 296/194 |
| 6,215,310 B1 | * | 4/2001 | Petrovich et al. ........... 324/378 |

FOREIGN PATENT DOCUMENTS

| | | |
|---|---|---|
| DE | 195 20 870 | 12/1996 |
| EP | 0 908 375 | 4/1999 |

OTHER PUBLICATIONS

Bauer, D: "Modultechnik in der Motorkuehlung", ATZ Automobiltechnische Zeitschrift, DE, Franckh'Sche Verlagshandlung, vol. 95, No. 9, Sep. 1, 1993, pp. 1–3, ISSN: 0001–2785.

* cited by examiner

Primary Examiner—D. Glenn Dayoan
Assistant Examiner—Lori L Coletta
(74) Attorney, Agent, or Firm—Liniak, Berenato & White

(57) ABSTRACT

Fixing of a fluid reservoir onto a part of the vehicle provided for this purpose. The reservoir is fixed onto the front-face module of the vehicle. A housing corresponding to the reservoir is provided in the module, into which the reservoir is inserted, then fixed by clipping.

11 Claims, 2 Drawing Sheets

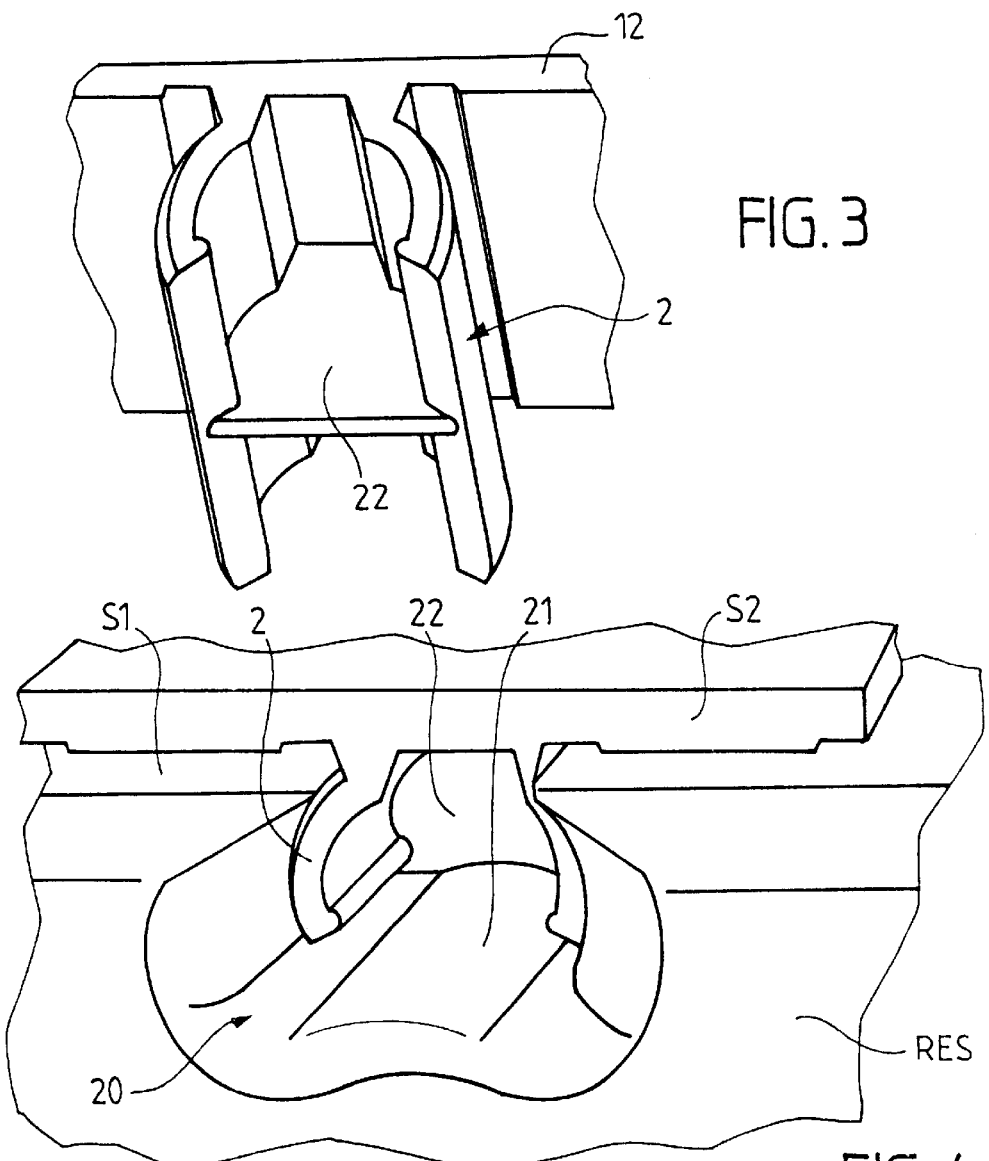
FIG. 3
FIG. 4
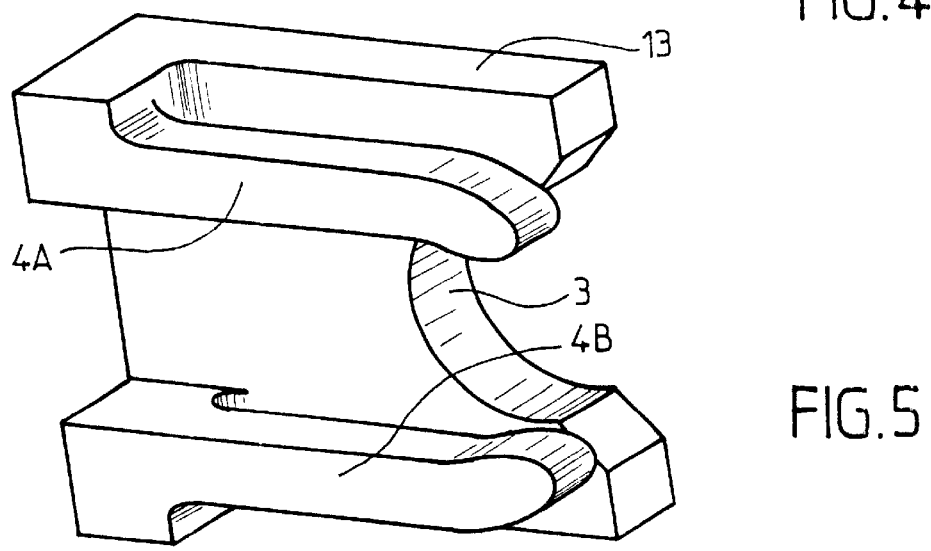
FIG. 5

FIXING OF A FLUID RESERVOIR, ESPECIALLY FOR AN ITEM OF MOTOR-VEHICLE EQUIPMENT

FIELD OF THE INVENTION

The invention relates to the fixing of a fluid reservoir onto a part of a motor vehicle.

BACKGROUND OF THE INVENTION

Such a reservoir, especially for an item of equipment of the vehicle, may, for example, contain a liquid for cooling the engine of the vehicle, or else a liquid for washing the windscreen.

Generally, reservoirs of this type are fixed onto the bodywork of the vehicle, projecting therefrom. This results in a bulk which it is desired to reduce in present-day vehicles.

Moreover, the vehicle usually includes a front-face module intended to support a plurality of items of equipment of the vehicle, such as headlamps, heat exchangers, etc. Certain items of equipment of this type, such as a radiator for cooling the engine of the vehicle, requiring a fluid reservoir, are fixed onto the front-face module, while their reservoir is then fixed onto the bodywork, which complicates the fitting of such equipment.

The present invention aims to improve the situation.

SUMMARY OF THE INVENTION

According to the present invention there is provided a method of fixing a fluid reservoir, especially for an item of motor-vehicle equipment, onto a front-face module of the vehicle, the method including the following steps:
  a) providing a fluid reservoir of chosen shape, as well as a front-face module comprising a housing matching the fluid reservoir,
  b) inserting the reservoir into the housing, and
  c) fixing the reservoir into its housing.

Here, the term "housing" is to be taken in the broad sense. It may relate to an aperture formed in the front-face module and intended to accommodate all or part of the reservoir. It may also relate to a recess formed in a surface of the module and intended to accommodate all or part of the reservoir. This recess may also be formed in an edge of the front-face module, while its walls are opposite only a part of the walls of the reservoir.

According to an advantageous optional characteristic of the invention, means are provided for sliding the reservoir in translation in the housing, in the course of inserting the reservoir into the housing.

Preferably the sliding means comprise a rib and a groove suitable for interacting with one another.

Advantageously, the housing includes a back wall substantially perpendicular to a direction of insertion of the reservoir into the housing, while the reservoir includes a protuberance facing the said back wall, so that, in the course of inserting the reservoir into the housing, the protuberance comes into contact with the back wall, which then forms an end stop.

According to another advantageous optional characteristic of the invention, means are provided for fixing the reservoir into the housing by clipping in the course of fixing the reservoir into its housing.

In a variant, the reservoir is fixed by overmoulding onto the housing of the front-face module, in the course of fixing the reservoir into its housing.

In another variant, it can be fixed by screws.

Hence, the front-face module, for implementing the method according to the invention, includes means for accommodating a fluid reservoir. That being so, the present invention also envisages such a front-face module.

For its part, the fluid reservoir, for implementing the method according to the invention, includes interacting means for inserting it and fixing it into a housing of a front-face module of the vehicle. That being so, the present invention also envisages such a fluid reservoir.

BRIEF DESCRIPTION OF THE DRAWINGS

An exemplary preferred embodiment of the invention will now be described with reference to the accompanying drawings, in which:

FIG. 3 represents a detailed view of a rib formed on a wall of the housing 1;

FIG. 4 represents the interaction of the rib represented in FIG. 3, with a groove formed in the reservoir RES; and FIG. 5 represents a detailed view of a part of the means for fixing the reservoir by clipping it into its housing.

Figure 1:
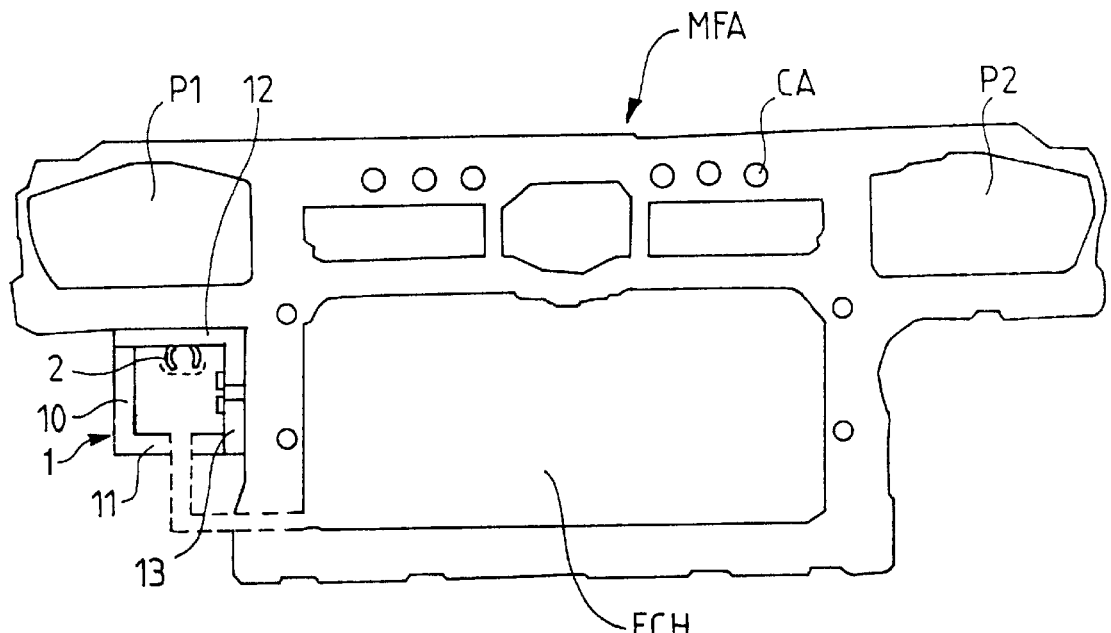
FIG. 1 represents an overall view of a front-face module MFA equipped, according to the invention, with a housing 1 for accommodating a fluid reservoir for an item of motor-vehicle equipment.

The drawings in essence contain elements of a certain nature. They could therefore not only serve to give a better understanding of the description, but also contribute to the definition of the invention, as the case may be.

DESCRIPTION OF THE PREFERRED EMBODIMENTS

In the various figures, like reference numerals refer to like parts.

Referring first of all to FIG. 1, a front-face module MFA of a motor vehicle is described. Such a module is intended to support a plurality of items of equipment of the motor vehicle, such as the headlamps (in the housings P1 and P2), at least one heat exchanger of the radiator type for cooling the engine of the vehicle (in the housing ECH), etc. The module includes other apertures, particularly for electrical cables or mechanical control cables to pass (in the apertures CA).

In the example described, the fluid reservoir (not represented in FIG. 1) contains a liquid for cooling the engine of the vehicle. It is connected to the engine-cooling radiator by means of a duct (represented in dashed lines). In the example represented in FIG. 1, it is housed in an aperture formed in the front-face module MFA, and bounded by four walls 10, 11, 12, 13, substantially forming a hollow parallelepiped, into which the reservoir is slipped.

Figure 2:
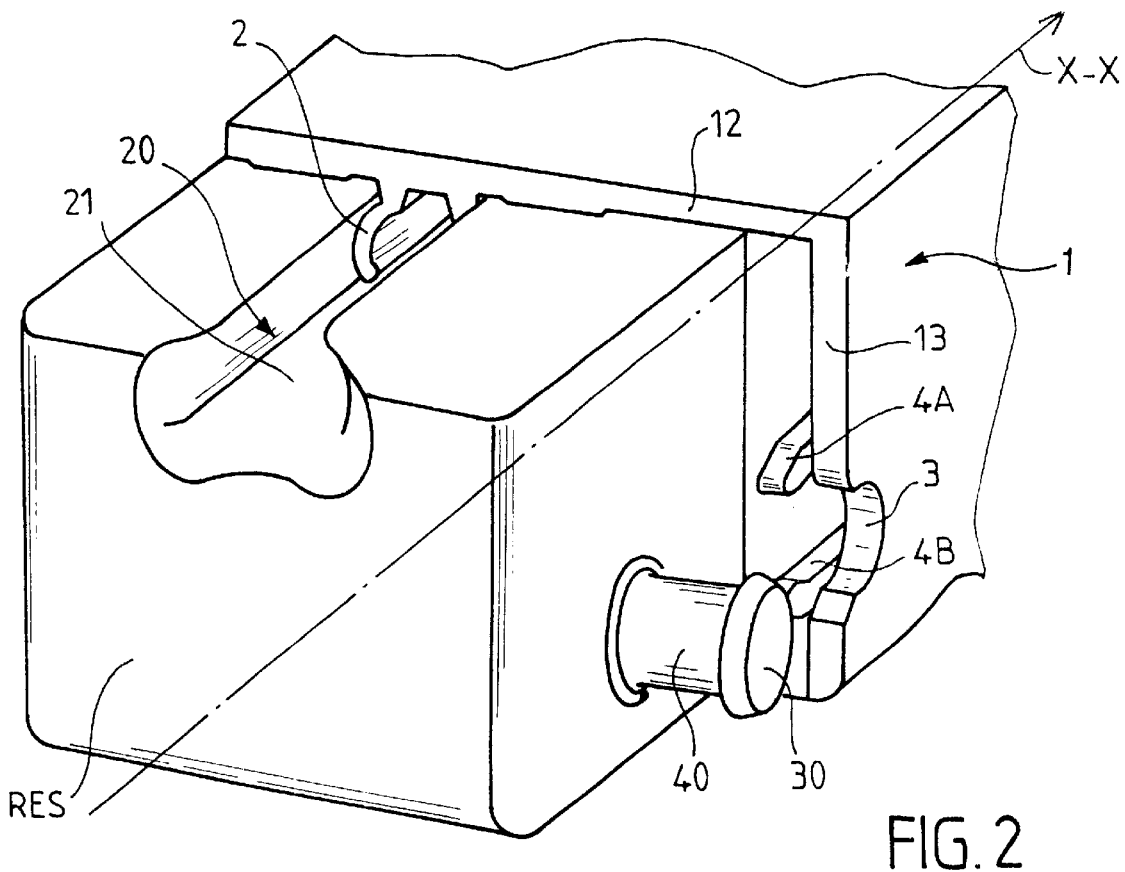
FIG. 2 represents a detailed view of the housing 1 and of a fluid reservoir RES, during the step b) of inserting the reservoir into its housing.

Referring in particular to FIG. 2, the upper wall 12 of the housing 1 formed advantageously comprises a rib 2 which exhibits a C shape in cross section. This rib 2 interacts with a groove 20, formed in the reservoir RES. Hence, the reservoir RES can slide in the housing 1, by virtue of the rib/groove link, of the "dovetail" type.

It should be noted that the interaction of the respective C shapes of the groove 20 and of the rib 2, added to the upper wall 12 of the housing 1, advantageously makes it possible to support the reservoir RES and to dispense with the lower wall 11 of the housing 1, as well as its sidewall 10, if appropriate.

The sidewall 13 of the housing 1 includes a U-shaped recess 3, intended to accommodate a pin 30 included on one side face of the reservoir RES, facing the sidewall 13 of the housing 1. The inner surface of the wall 13 moreover includes two elastic tabs 4A and 4B (FIG. 5) which, for their part, accommodate an annular groove 40 formed on the pin 30. Hence, the pin 30 and the elastic tabs form means for clipping the reservoir RES into the housing 1.

Referring now to FIG. 3, the rib 2 of the housing includes a wall 22, substantially perpendicular to the general axis of the rib 2, while the groove 20 formed in the reservoir RES exhibits a boss 21 (FIG. 4) along at least a part of the groove 20. Hence, the back wall 22 forms an end stop on the boss 21, in the translational movement for inserting the reservoir RES into the housing 1.

Referring to FIG. 4, bearing surfaces S1 and S2 are moreover provided, respectively on the reservoir and on the wall 12 of the housing, which advantageously facilitates the movement for clipping the pin 30 onto the tabs 4A and 4B.

The reservoir RES is fixed into its housing 1 as follows:

the rib 2 of the housing 1 is inserted into the groove 20 formed on the upper face of the reservoir RES;

the reservoir RES slides in translation in the housing 1, along the axis X—X represented in FIG. 2;

the boss 21 comes into abutment against the back wall 22 provided on the rib 2; and the elastic tabs 4A and 4B which the inner face of the wall 13 of the housing 1 carries come to be clipped onto the annular groove 40 which the pin 30 fitted on the reservoir RES includes, while the pin 30 comes into abutment against the U-shaped recess 3 formed in the wall 13.

It should be noted that the position of the back wall 22, relative to the depth of the recess 3, is chosen in such a way that the boss 21 comes into abutment against the wall 22 and the pin 30 comes up against the recess 3, with similar kinematic aspects.

According to one of the major advantages which the present invention procures, the cooling radiator, mounted in its housing ECH, is already equipped with its cooling-liquid reservoir RES fixed into the housing 1 of the front-face module MFA. Thus a plurality of fluid-reservoir housings can be provided for items of equipment requiring a reservoir, and can be mounted on the front-face module. The front-face module, thus pre-equipped, can then be fixed onto the bodywork of the vehicle.

Clearly, the present invention is not limited to the embodiment described above by way of example; it extends to other variants.

Hence, it will be understood that the fluid reservoir RES can contain a fluid other than a liquid for cooling the vehicle engine, such as a liquid for washing a window of the vehicle, such as the windscreen. The reservoir RES may moreover contain a fluid in gaseous form, or even in two phases (liquid and gas), especially as regards a reservoir of cooling fluid of an air-conditioning circuit of the motor vehicle.

The four-wall housing is represented in FIG. 1 by way of example. In a variant, this housing may include only two or three walls and the walls 10 and/or 11 are dispensed with. It should be noted that in the three-wall variant, provision can be made for links of the rib/groove type in order to make the reservoir RES slide in the manner of a drawer in the housing 1.

The means for fixing by clipping are described above by way of example. In a variant, provision can be made to screw the reservoir RES, after it has been inserted into the housing 1.

Provision may moreover be made to fix the reservoir RES into its housing by overmoulding, for example by adding plastic at least on the junctions between the walls 12 and 13 and the reservoir RES.

The back wall 22, forming an end stop, is described above by way of example. In a variant, this back wall can be formed on the wall 12 and/or the wall 13, in the back of the housing 1.

Moreover, the interaction of a rib with a groove is described above by way of example. In a variant, a four-wall housing can be provided, the reservoir RES sliding between these four walls up to the back of the housing 1.

I claim:

1. A method of fixing a fluid reservoir of a heat exchanger for motor-vehicle equipment, onto a front-face module of the vehicle, the method including the following steps:

a) providing a heat exchanger comprising a fluid reservoir of chosen shape, apart from the heat exchanger and connected to the heat exchanger by a duct for delivering fluid between the heat exchanger and fluid reservoir, b) providing a front-face module comprising a housing substantially matching said chosen shape of said fluid reservoir, c) inserting the reservoir into the housing, and d) fixing the reservoir into its housing.

2. The method of claim 1, wherein means are provided for sliding the reservoir in translation in the housing, in the course of inserting the reservoir into the housing.

3. The method of claim 2, wherein the sliding means comprise a rib and a groove suitable for interacting with one another.

4. The method of claim 3, wherein the module includes a rib on a wall of said housing, substantially parallel to a direction of insertion of the reservoir into the housing, while the reservoir includes a groove configured to accommodate said rib.

5. The method of claim 3, wherein the housing includes a back wall substantially perpendicular to a direction of insertion of the reservoir into the housing, while the reservoir includes a protuberance facing said back wall, so that, in the course of inserting the reservoir into the housing, the protuberance comes into contract with the back wall, which forms an end stop.

6. The method of claim 3, wherein the module includes a rib on a wall of said housing, substantially parallel to a direction of insertion of the reservoir into the housing, while the reservoir includes a groove configured to accommodate said rib, wherein the housing includes a back wall substantially perpendicular to a direction of insertion of the reservoir into the housing, while the reservoir includes a protuberance facing said back wall, so that, in the course of inserting the reservoir into the housing, the protuberance comes into contact with the back wall, which forms an end stop, and wherein the protuberance is produced in the form of a boss along at least a part of said groove, while the rib, in a cross-sectional view, is generally C-shaped and is able to accommodate said protuberance.

7. The method of claim 1, wherein means are provided for fixing the reservoir into the housing by clipping in the course of fixing the reservoir into its housing.

8. The method of claim 7, wherein a wall of the housing includes a U-shaped recess, suitable for accommodating a pin which a wall of the reservoir carries, facing the recess.

9. The method of claim 8, wherein the wall of the housing, equipped with said recess, carries two elastic tabs suitable for being clipped into a groove which said pin includes.

10. The method of claim 1, wherein the reservoir is fixed by overmoulding into the front-face module, in the course of fixing the reservoir into its housing.

11. A front-face module of a motor vehicle, comprising means for accommodating a fluid reservoir for delivering fluid to a heat exchanger of said vehicle, said reservoir defining a chosen shape, said means comprising a housing formed to match said chosen shape of said fluid reservoir and means for fixing the reservoir into said housing separately disposed from the heat exchanger.

\* \* \* \* \*